(12) United States Patent
Goergen et al.

(10) Patent No.: US 12,526,191 B2
(45) Date of Patent: Jan. 13, 2026

(54) STANDARDIZED POWER MEASUREMENTS WITH INCREASED ACCURACY

(71) Applicant: Cisco Technology, Inc., San Jose, CA (US)

(72) Inventors: Joel Richard Goergen, Soulsbyville, CA (US); Elizabeth Kochuparambil, Morgan Hill, CA (US); Alpesh U. Bhobe, Sunnyvale, CA (US); Sean C. Pegado, Washington, DC (US); Marc Mantelli, Morgan Hill, CA (US); Angelo Fienga, Rome (IT); Fitim Sallahu, Jönköping (SE); Kameron Hurst, Sonora, CA (US); Hrishikesh Pawar, Karnataka (IN)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 18/418,161

(22) Filed: Jan. 19, 2024

(65) Prior Publication Data
US 2025/0240208 A1    Jul. 24, 2025

(30) Foreign Application Priority Data

Sep. 14, 2023  (IN) .............................. 202321061950

(51) Int. Cl.
*H04L 1/1822* (2023.01)
*H04L 1/1812* (2023.01)
(Continued)

(52) U.S. Cl.
CPC .......... *H04L 41/0833* (2013.01); *H04L 43/08* (2013.01)

(58) Field of Classification Search
CPC ... H04L 41/0833; H04L 43/08; H04L 1/1812; H04L 1/1822
(Continued)

(56) References Cited

U.S. PATENT DOCUMENTS

| 7,925,431 | B2* | 4/2011 | Gallagher ............... F01N 9/002 701/19 |
| 11,734,778 | B2* | 8/2023 | Uyeki ..................... B60L 53/64 705/7.22 |

(Continued)

FOREIGN PATENT DOCUMENTS

| JP | 2015087240 A | 5/2015 |
| KR | 101356289 B1 | 1/2014 |

OTHER PUBLICATIONS

Yokogawa: "High-Precision Power Measurement of EV Charging Equipment", Test&Measurement, Aug. 1, 2023, Retrieved from https://tmi.yokogawa.com/in/library/resources/application-notes/high-precision-power-measurement-of-ev-charging-equipment/, 4 Pages.

(Continued)

*Primary Examiner* — Jude Jean Gilles
(74) *Attorney, Agent, or Firm* — Rutan & Tucker, LLP; Ravi Mohan; Marc McClain

(57) ABSTRACT

Devices, networks, systems, methods, and processes for standardizing power usage measurement in various devices, components, etc. Measurement methods for power verification in AC or DC input power are often over simplified or done with a method that achieves inaccurate or highly suspect results. Different testing methods for the same device to be verified are often used, resulting in lack of consistency and any sense of accuracy and/or relevance. Part of this problem is the lack of unified electrical measuring and changes in operation based on network usage and ambient temperature. Thus, various embodiments described herein are directed to generating standardized power usage (Continued)

data and charts that can indicate a more accurate power usage level of an apparatus. This can allow for more effective network managing decisions and increase overall network sustainability.

20 Claims, 12 Drawing Sheets

(51) Int. Cl.
    *H04L 41/0833* (2022.01)
    *H04L 43/08* (2022.01)
(58) Field of Classification Search
    USPC .......................................................... 709/204
    See application file for complete search history.

(56) References Cited

U.S. PATENT DOCUMENTS

| 2009/0111506 | A1* | 4/2009 | Laroia ................. H04W 52/267 |
| | | | 455/550.1 |
| 2012/0053740 | A1* | 3/2012 | Venkatakrishnan ... G06Q 50/06 |
| | | | 700/291 |
| 2012/0208672 | A1* | 8/2012 | Sujan ..................... B60W 20/14 |
| | | | 180/65.265 |
| 2013/0214608 | A1* | 8/2013 | Kubota ................... H02J 3/381 |
| | | | 307/82 |
| 2013/0275064 | A1* | 10/2013 | Tseng ..................... G01R 21/02 |
| | | | 702/60 |
| 2016/0359325 | A1* | 12/2016 | Kawata ............... H04L 12/2829 |
| 2020/0395627 | A1* | 12/2020 | Kilburn ............... H02J 7/00714 |
| 2023/0388891 | A1* | 11/2023 | Wu ................. H04W 36/00692 |

OTHER PUBLICATIONS

International Search Report and Written Opinion for International Application No. PCT/US2024/046671, mailed Mar. 3, 2025, 15 Pages.

* cited by examiner

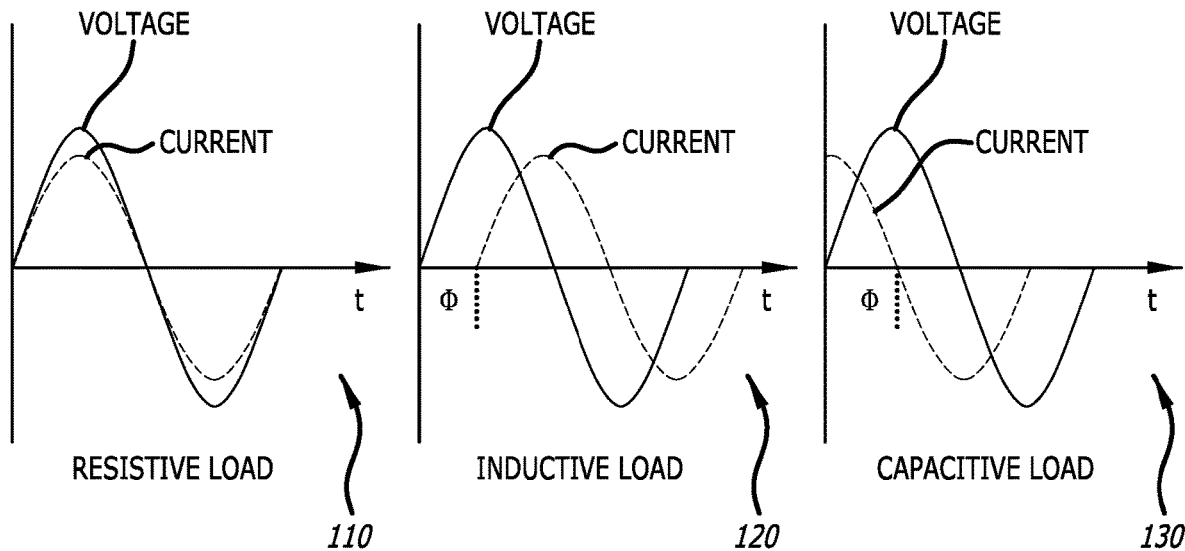

FIG. 6

Normalize PSU Loss — 600

| Temperature | Packet Type | Rate IDLE | 10% | 30% | 50% | 75% | 100% |
|---|---|---|---|---|---|---|---|
| 23degC | IMIX | w | w/Gbps | w/Gbps | w/Gbps | w/Gbps | w/Gbps |
| | rnd data / rnd size 64b to 9216b | w | w/Gbps | w/Gbps | w/Gbps | w/Gbps | w/Gbps |
| | rnd data / rnd size 64b to 1518b | w | w/Gbps | w/Gbps | w/Gbps | w/Gbps | w/Gbps |
| | Avg feature set rnd size/data | w | w/Gbps | w/Gbps | w/Gbps | w/Gbps | w/Gbps |
| 27degC | IMIX | w | w/Gbps | w/Gbps | w/Gbps | w/Gbps | w/Gbps |
| | rnd data / rnd size 64b to 9216b | w | w/Gbps | w/Gbps | w/Gbps | w/Gbps | w/Gbps |
| | rnd data / rnd size 64b to 1518b | w | w/Gbps | w/Gbps | w/Gbps | w/Gbps | w/Gbps |
| | Avg feature set rnd size/data | w | w/Gbps | w/Gbps | w/Gbps | w/Gbps | w/Gbps |
| 35degC | IMIX | w | w/Gbps | w/Gbps | w/Gbps | w/Gbps | w/Gbps |
| | rnd data / rnd size 64b to 9216b | w | w/Gbps | w/Gbps | w/Gbps | w/Gbps | w/Gbps |
| | rnd data / rnd size 64b to 1518b | w | w/Gbps | w/Gbps | w/Gbps | w/Gbps | w/Gbps |
| | Avg feature set rnd size/data | w | w/Gbps | w/Gbps | w/Gbps | w/Gbps | w/Gbps |
| 40degC | IMIX | w | w/Gbps | w/Gbps | w/Gbps | w/Gbps | w/Gbps |
| | rnd data / rnd size 64b to 9216b | w | w/Gbps | w/Gbps | w/Gbps | w/Gbps | w/Gbps |
| | rnd data / rnd size 64b to 1518b | w | w/Gbps | w/Gbps | w/Gbps | w/Gbps | w/Gbps |
| | Avg feature set rnd size/data | w | w/Gbps | w/Gbps | w/Gbps | w/Gbps | w/Gbps |
| 45degC IOT / SP Access only | IMIX | w | w/Gbps | w/Gbps | w/Gbps | w/Gbps | w/Gbps |
| | rnd data / rnd size 64b to 9216b | w | w/Gbps | w/Gbps | w/Gbps | w/Gbps | w/Gbps |
| | rnd data / rnd size 64b to 1518b | w | w/Gbps | w/Gbps | w/Gbps | w/Gbps | w/Gbps |
| | Avg feature set rnd size/data | w | w/Gbps | w/Gbps | w/Gbps | w/Gbps | w/Gbps |
| 50degC IOT / SP Access only | IMIX | w | w/Gbps | w/Gbps | w/Gbps | w/Gbps | w/Gbps |
| | rnd data / rnd size 64b to 9216b | w | w/Gbps | w/Gbps | w/Gbps | w/Gbps | w/Gbps |
| | rnd data / rnd size 64b to 1518b | w | w/Gbps | w/Gbps | w/Gbps | w/Gbps | w/Gbps |
| | Avg feature set rnd size/data | w | w/Gbps | w/Gbps | w/Gbps | w/Gbps | w/Gbps |

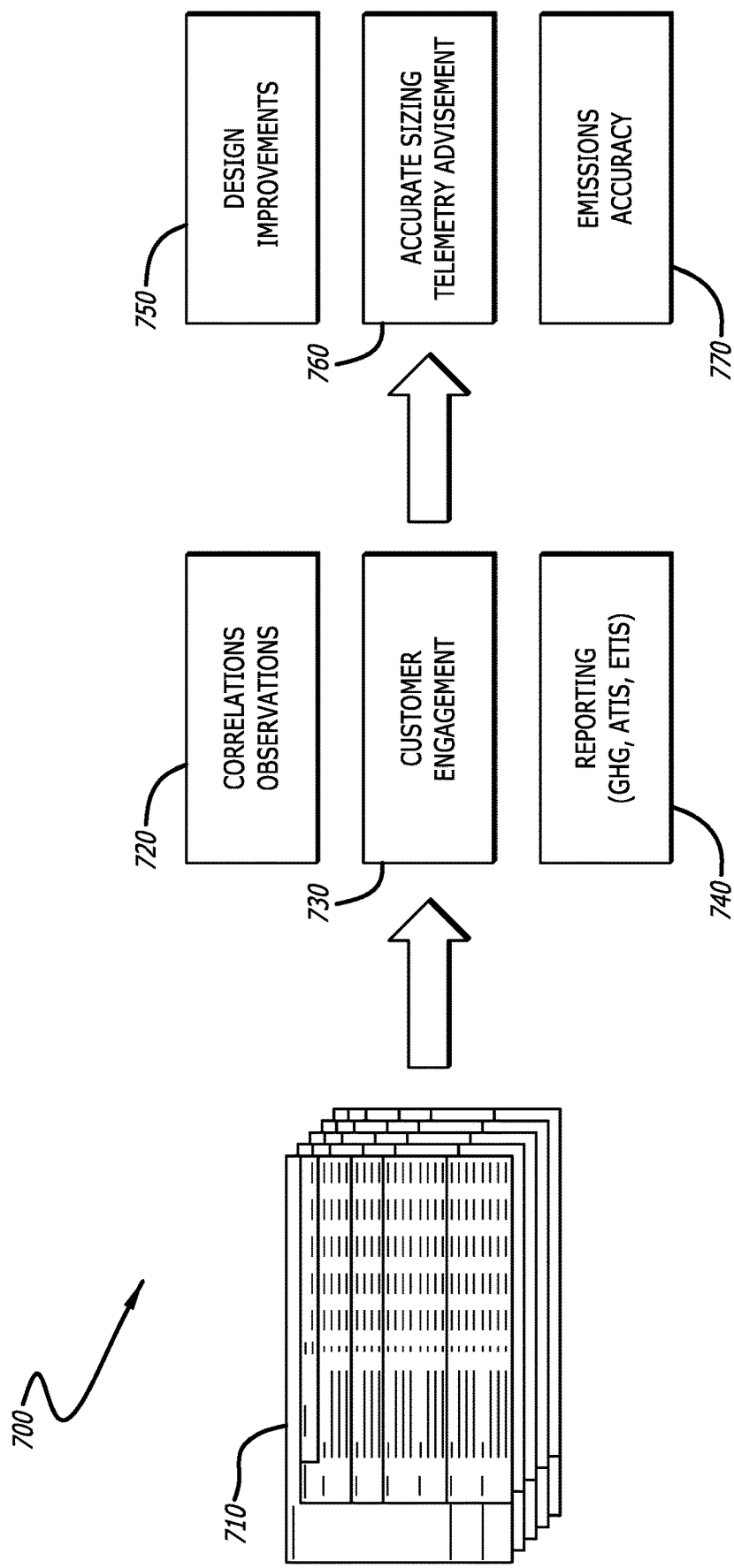

STANDARDIZED POWER MEASUREMENTS WITH INCREASED ACCURACY

PRIORITY

This application claims the benefit of and priority of Indian Provisional patent application No. 202321061950, filed Sep. 14, 2023, the disclosure of which is incorporated by reference herein in its entirety.

FIELD

The present disclosure relates to power measurements. More particularly, the present disclosure relates to standardizing power measurements to provide more accurate power readings.

BACKGROUND

Power verification in both AC and DC input systems involves the measurement of various electrical parameters to ensure proper functioning and compliance with specifications. In AC power systems, essential measurements include voltage, current, power factor, and frequency. Voltage is typically measured using voltmeters, while current is measured with ammeters. Power factor, representing the phase relationship between voltage and current, is evaluated to assess the efficiency of power utilization. Frequency, crucial for synchronized operation, is measured using frequency meters.

In DC power systems, voltage and current measurements remain fundamental, usually performed using multimeters. Additionally, power in DC systems can be determined using the product of voltage and current. To ensure accuracy and reliability, advanced measurement instruments such as power analyzers may be employed in both AC and DC systems, offering comprehensive insights into parameters like harmonic content and total harmonic distortion. The verification process involves comparing measured values with design specifications to identify any deviations and address potential issues, ensuring the system's optimal performance and adherence to operational standards.

However, measurement methods for power verification in AC or DC input power are often over simplified or done with a method that achieves inaccurate or highly suspect results. It can be verified easily that engineering labs or customer labs use different methods for the same device to be verified, resulting in lack of consistency and any sense of accuracy and/or relevance. Further compounding the problem is that any read done by software of and input voltage/current or output voltage/current has a accuracy of +/−20% to +/−50%, depending on the power loading and the component choice/layout doing the measurement, as well as the fact that command line interfaces/software I2C readings of these values are instantaneous and not an RMS or basic average seen in a typical volt ohm meter. Furthermore, read values don't often have a point of normalization as reference to dynamically point out or address accuracy of the readings. Finally, because the data gathered is extremely inaccurate, customers don't have a valid means of calculating carbon footprints, and examining operating range trade-offs to correctly size and operate equipment to a specific operating environment.

SUMMARY OF THE DISCLOSURE

Systems and methods for standardizing power measurements to provide more accurate power readings in accordance with embodiments of the disclosure are described herein. In some embodiments, a method for generating standardized power usage data includes selecting an apparatus for measurement within a measuring environment, establishing a predetermined temperature within the measuring environment, generating a traffic pattern with a predetermined composition, operating the apparatus by processing the traffic pattern, normalizing one or more electrical units for an electrical measurement process, conducting the electrical measurement process on the apparatus, and generating power usage data based on the electrical measurement process.

In some embodiments, the electrical measurement process is conducted two or more times.

In some embodiments, the measuring environment is established to a unique predetermined temperature for each of the two or more electrical measurement processes.

In some embodiments, the traffic pattern is generated with a unique composition for each of the two or more electrical measurement processes.

In some embodiments, the traffic pattern is generated with a unique composition for each of the two or more electrical measurement processes.

In some embodiments, at least one of the unique predetermined temperatures is a room temperature.

In some embodiments, the measuring environment is established to a unique predetermined temperature for each of the two or more electrical measurement processes.

In some embodiments, the generation of the power usage data is based on the two or more electrical measurement processes.

In some embodiments, the apparatus is configured to utilize electricity.

In some embodiments, the apparatus is a network device.

In some embodiments, the apparatus is a component configured for use within a network device.

In some embodiments, the electrical units are included of at least one of a power load vs a power factor, power efficiency, or an I-share curve.

In some embodiments, the traffic pattern is configured to mimic typical usage associated with the apparatus.

In some embodiments, a device includes a processor, a memory commutatively coupled to the processor, a plurality of elements, and a sustainability logic. The logic is configured to establish a predetermined temperature within a measuring environment, generate a traffic pattern with a predetermined composition, operate an apparatus by directing the apparatus to process the traffic pattern, normalize one or more electrical units for an electrical measurement process, conduct the electrical measurement process on the apparatus, and generate power usage data based on the electrical measurement process.

In some embodiments, the conducting of the electrical measurement process on the apparatus while processing the one or more traffic patterns.

In some embodiments, the processing of the one or more traffic patterns is configured to occur via one or more communication ports.

In some embodiments, conducting the electrical measurement process is repeated at a plurality of unique combinations of predetermined temperatures and predetermined compositions.

In some embodiments, the generating of the power usage data is based on the repeated electrical measurement processes.

In some embodiments, the sustainability logic is further configured to execute at least one network management decision based on the generated power usage data.

In some embodiments, a device includes a processor, a memory commutatively coupled to the processor, a plurality of elements, and a sustainability logic. The logic is configured to direct a measuring environment to establish a predetermined temperature, provide power to an apparatus within the measuring environment, establish a connection to the apparatus via one or more communication ports, transmit a generated traffic pattern over the one or more communication ports, normalize one or more electrical units for an electrical measurement process, conduct the electrical measurement process on the apparatus, and generate power usage data based on the electrical measurement process.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 1 is a conceptual illustration of various power measurements, in accordance with various embodiments of the disclosure;

FIG. 2 is a conceptual illustration of a command line interface, in accordance with various embodiments of the disclosure;

FIG. 6 is a conceptual illustration of a standardized power usage chart, in accordance with various embodiments of the disclosure;

FIG. 7 is a conceptual illustration of utilizing standardized power usage charts to execute network management decisions, in accordance with various embodiments of the disclosure;

Figure 3A:
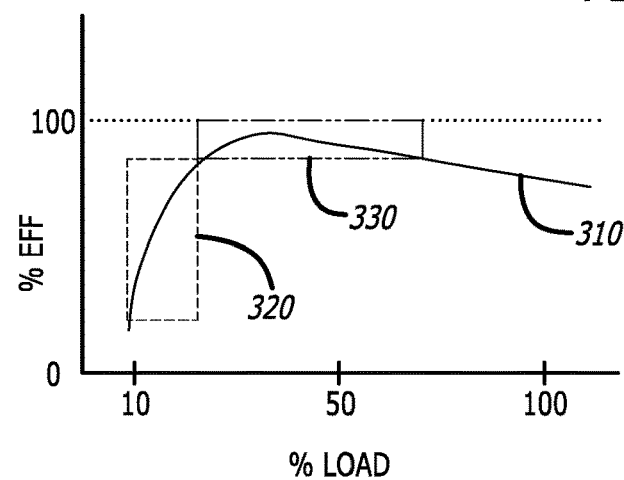
FIG. 3A is a conceptual illustration of an efficiency curve, in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that standardize power usage data. As a result of the problems and issues described above, an over payment of carbon tax and energy use can occur. In response, embodiments are described below to achieve a more accurate carbon footprint in the appropriate operating environment based on need, customer, and location. These standardized power usage charts can be generated to better select network devices or other components for use, and may be utilized in various decision-making actions when managing a network, such as, but not limited to, directing traffic to lower power using devices.

As those skilled in the art will recognize, different companies within various markets can, and often do, measure power in various ways. In some embodiments, a command line interface or a current clamp can be utilized. In some cases, the use of uncalibrated and/or inaccurate power meters can occur. However, some accurate methods can be utilized such as a Chroma power measurement method. However, measurement methods may be applied inconsistently even within the same group and/or company, and may even change depending on the day or personnel on staff. As a result, there is often no accuracy or consistency across data sheet power values or power calculator tools.

Various temperature ranges can provide effective coverage of reasonable system operation for relative comparisons across various deployments and installations. For example, room temperature of twenty-three degrees Celsius can allow for fast analysis and verification. An acoustic measurement temperature of twenty-seven degrees Celsius may also be utilized. In many embodiments, the maximum normal operating temperature can be forty degrees Celsius. Systems may run much hotter in certain applications, but those higher temperatures may be considered a fault case scenario. For certain embodiments, such as those specific systems like internet of things (IoT) or the like, can be tested at a fifty-degree Celsius temperature.

Regarding traffic patterns, in various embodiments, the system can be stabilized for five minutes running the traffic pattern at the desired temperature prior to measuring the power usage. If the power measurement is stable over the next minute, then that temperature may be selected for use. When it is not stable, another time period (such as a minute) may be waited prior to taking another measurement and seeing that shows a stabilization between the prior measurement(s). In some embodiments, the power measurement can be considered stable only when a fan tray variance is found to occur. This variance can be understood as taking the average between the high measurement and the low measurement. In more embodiments, temperatures can have a thirty-minute dwell time, followed by a thirty-minute to sixty-minute settling time. When handling jumps between temperature ranges, a waiting period may be utilized for stabilization. It may be desired for temperature and power to stabilize for thirty minutes.

In regard to traffic test set-ups, a max port speed for the test can be defined. This may be appropriate for optical and/or copper cabling modules and systems. For certain configurations, traffic patterns may be randomized by packet size. In some embodiments, the randomization can be from 64 bytes to 9216 bytes. In additional embodiments, the randomization can be between 64 bytes and 1518 bytes. However, as those skilled in the art will recognize, any type of packet size may be utilized as needed. In still more embodiments, the average customer feature set can be defined and set with random data and sizes based on the input security, input quality of service classifiers, egress security, or the like.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "power lines," "power grids," power source," "power consumption," and "power plant" when describing energy delivery and utilization, even though those skilled in the art will recognize that those elements are delivering or processing energy (specifically electricity) at a certain rate of power. References to these terms are utilized herein specifically to increase the case of reading.

Those skilled in the art will recognize that the generation of electricity within the various power plants often creates some pollution or, more generally, one or more negative environmental impacts, which can often come in the form of emissions. However, these negative environmental impacts can come in a variety of forms including, but not limited to, land use, ozone depletion, ozone formation inhibition, acidification, eutrophication (freshwater, marine, and terrestrial), abiotic resource depletion (minerals, metals, and fossil fuels), toxicity, water use, negative soil quality change, ionizing radiation, hazardous waste creation, etc. As such, these negative environmental impact measurements can be measured with specific units to quantify these changes. Various aspects of energy use can be associated with one or more of these negative environmental impacts and classified as one or more sustainability-related attributes. Embodiments described herein can be utilized to reduce the overall negative environmental impacts through the generation of standardized power usage data and charts.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system.". Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C.". An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of various power measurements, in accordance with various embodiments of the disclosure is shown. As those skilled in the art will recognize, power is typically defined as volts multiplied by amperes. However, that calculation is typically only true with resistive loads. Various embodiments described herein can be configured with a plurality of capacitive loads. In light of that, power may alternatively be defined as volts multiplied by both current and the cosine of phi which can indicate how much power is lost during the "transport" of power, which is often known as a power factor. This formula can indicate the actual power used. The embodiment depicted in FIG. 3, depicts multiple loads including a resistive load 110, an inductive load 120, and a capacitive load 130. The offset is denoted by the Greek symbol phi, which is the previously described power factor.

Although a specific embodiment for various power measurements suitable for carrying out the various steps, processes, methods, and operations described herein is discussed with respect to FIG. 1, any of a variety of systems and/or processes may be utilized in accordance with embodiments of the disclosure. For example, the loads depicted in FIG. 1 are simplified for case of illustration and may be different or more complex in various embodiments. The elements depicted in FIG. 1 may also be interchangeable with other elements of FIGS. 2-12 as required to realize a particularly desired embodiment.

Referring to FIG. 2, a conceptual illustration of a command line interface, in accordance with various embodiments of the disclosure is shown. In many traditional systems, a command line interface 200 may be utilized to respond to a query about the current power values of various components and/or systems. However, traditional command line interfaces can generate reports with significant errors, in some cases up to twenty-five percent over or under the actual values. In embodiments where the power factor is less than 0.5, the errors generated by the command line interfaces can increase significantly. As various embodiments, methods, and systems described herein are often configured to operate with a power factor of less than 0.3, these issues can be exacerbated.

Although a specific embodiment for a command line interface suitable for carrying out the various steps, processes, methods, and operations described herein is discussed with respect to FIG. 2, any of a variety of systems and/or processes may be utilized in accordance with embodiments of the disclosure. For example, the command line interface may be presented in a graphical user interface depending on the deployment. Additionally, the data presented in the command line interface. may be formatted differently or may have more or less data displayed and/or collected. The elements depicted in FIG. 2 may also be interchangeable with other elements of FIG. 1 and FIGS. 3A-12 as required to realize a particularly desired embodiment.

Referring to FIG. 3A, a conceptual illustration of an efficiency curve, in accordance with various embodiments of the disclosure is shown. As those skilled in the art will further recognize, power efficiency can be calculated as the power out divided by the power in. However, this is often only true with resistive loads. Again, various embodiments described herein are configured to primarily utilize capacitive loads. Power efficiency may be alternatively defined as equal to the power out divided by the real power in. This equation can be considered to be the "actual" power efficiency. Because of the measurement error from command lines, such as those previously described in the discussion FIG. 2, the power values reported cannot be used for a proper efficiency analysis.

In the embodiment depicted in FIG. 3A, the chart 300 shows a conceptual "typical" curve 310 associated with the efficiency of a device over a percentage of the load provided. The curve 310 is shown with a first power efficiency area 320, labeled as a "worst case operation" and a second power efficiency area 330, which is labeled as "optimal operation". As more load is added to the device, the curve 310 increase until it leaves the first power efficiency area 320 and enters the more optimal second power efficiency area 330. Eventually, a peak point where the curve 310 enters the highest efficiency is reached. As more load is added, the curve 310 can slowly decrease the efficiency.

Figure 3B:
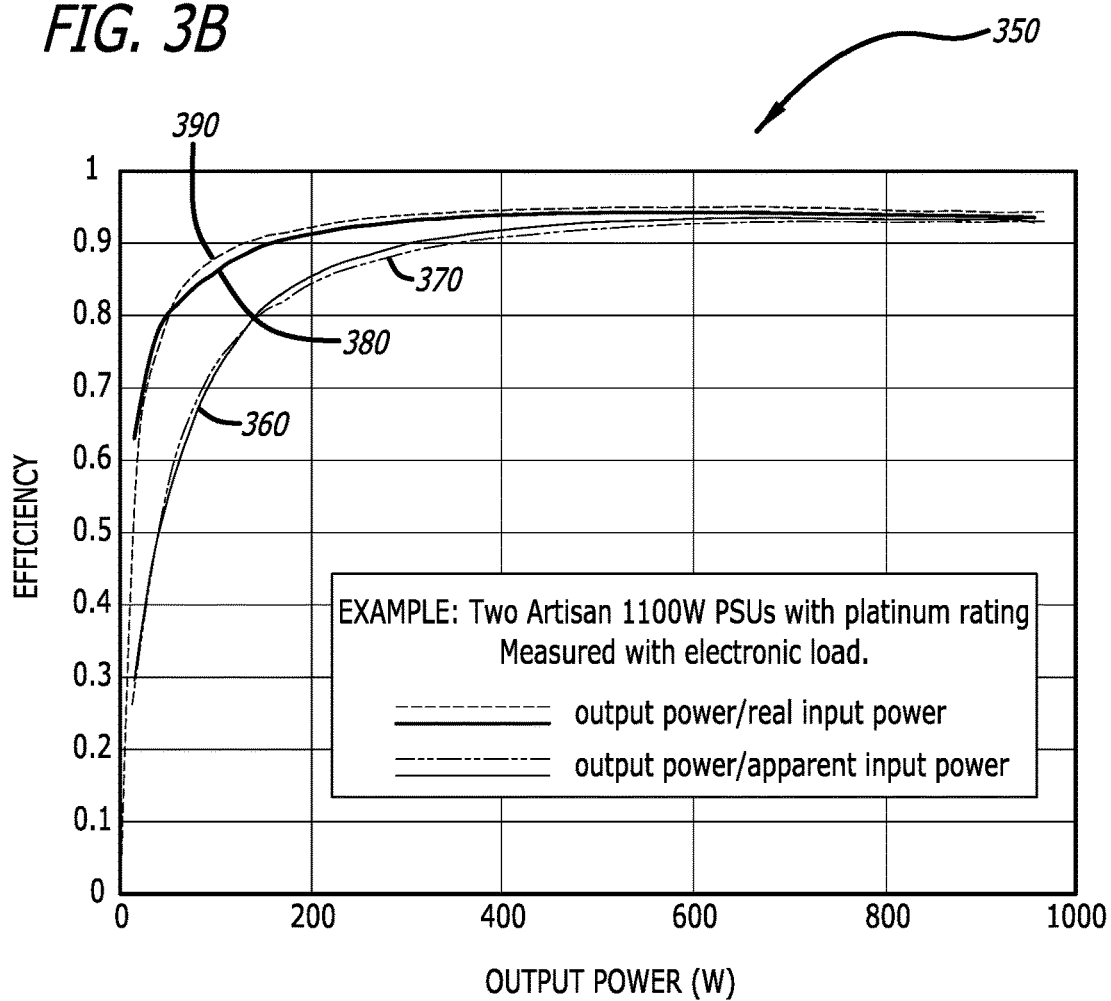
FIG. 3B is a graph depicting an exemplary power vs. real power, in accordance with various embodiments of the disclosure.

Referring to FIG. 3B, a graph depicting an exemplary power vs. real power, in accordance with various embodiments of the disclosure is shown. The embodiment depicted in FIG. 3B is associated with two real devices. The chart 350 is similar to the chart 300 depicted in FIG. 3A, with an exception that the efficiency of a device is charted against the output power of the device (in Watts) instead of a percentage of the load provided. The first pair of curves 360, 370 are associated with a first power supply, while the second pair of curves 380, 390 are associated with a second power supply. Regarding the first pair of curves 360, 370, one curve 360, is associated with the output power of the first power supply, while the second curve 370 is associated with the real input power of the first power supply. Likewise, the first curve 380 of the second pair of curves 380, 390, is associated with the output power of the second power supply, while the second curve 390 is associated with the real input power of the second power supply.

Although specific embodiments for efficiency and power curves suitable for carrying out the various steps, processes, methods, and operations described herein is discussed with respect to FIGS. 3A-3B, any of a variety of systems and/or processes may be utilized in accordance with embodiments of the disclosure. For example, the types of graphs utilized may vary depending on the application desired. Additionally, more, or fewer items may be measured to determine various efficiency or output power levels. The elements depicted in FIGS. 3A-3B may also be interchangeable with other elements of FIGS. 1-2 and 4A-12 as required to realize a particularly desired embodiment.

Figure 4A:
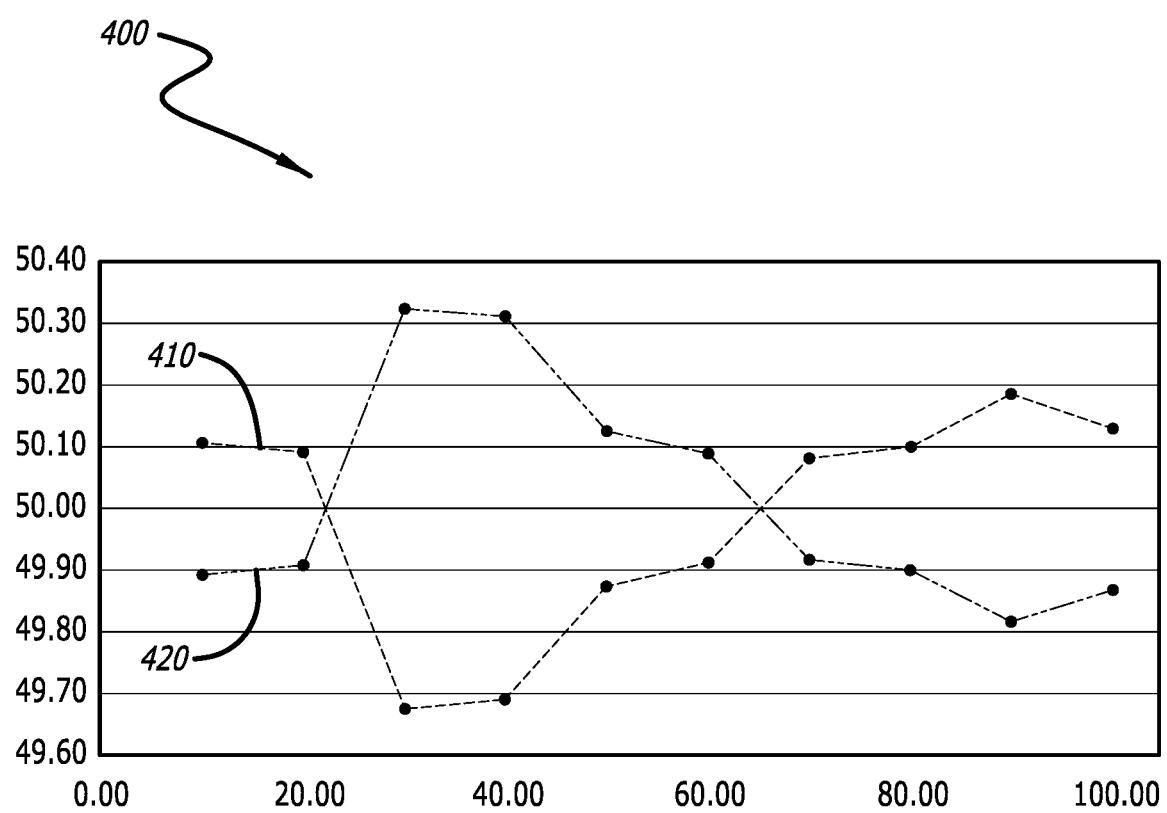
FIG. 4A is a graph depicting an exemplary power sharing arrangement between two devices, in accordance with various embodiments of the disclosure.

Referring to FIG. 4A, a graph depicting an exemplary power sharing arrangement between two devices, in accordance with various embodiments of the disclosure is shown. "Current Share" (often denoted as "I-Share") is a function (often analog) that allows a plurality of power supplies to contribute output power in an equal manner. In many embodiments, the I-share output power can be up to plus/minus ten percent. I-Share can have multiple disadvantages associated with determining a power factor. Firstly, in dual supply applications, the supplies can contribute sixty/forty, where one supply now has a lower power factor with more measurement error. Secondly, the power sharing can reverse unexpectedly. The embodiment depicted in FIG. 4, shows a graph 400 of two power supplies denoted by a first line 410 and a second line A20. The first line 410 and second line 410 denote the power output over time of the two power supplies. Each of the supplies outputs power at various levels such that they equal a given shared level. As can be seen, as one power supply outputs less power, the other power supply outputs more power, and vice-versa.

Figure 4B:
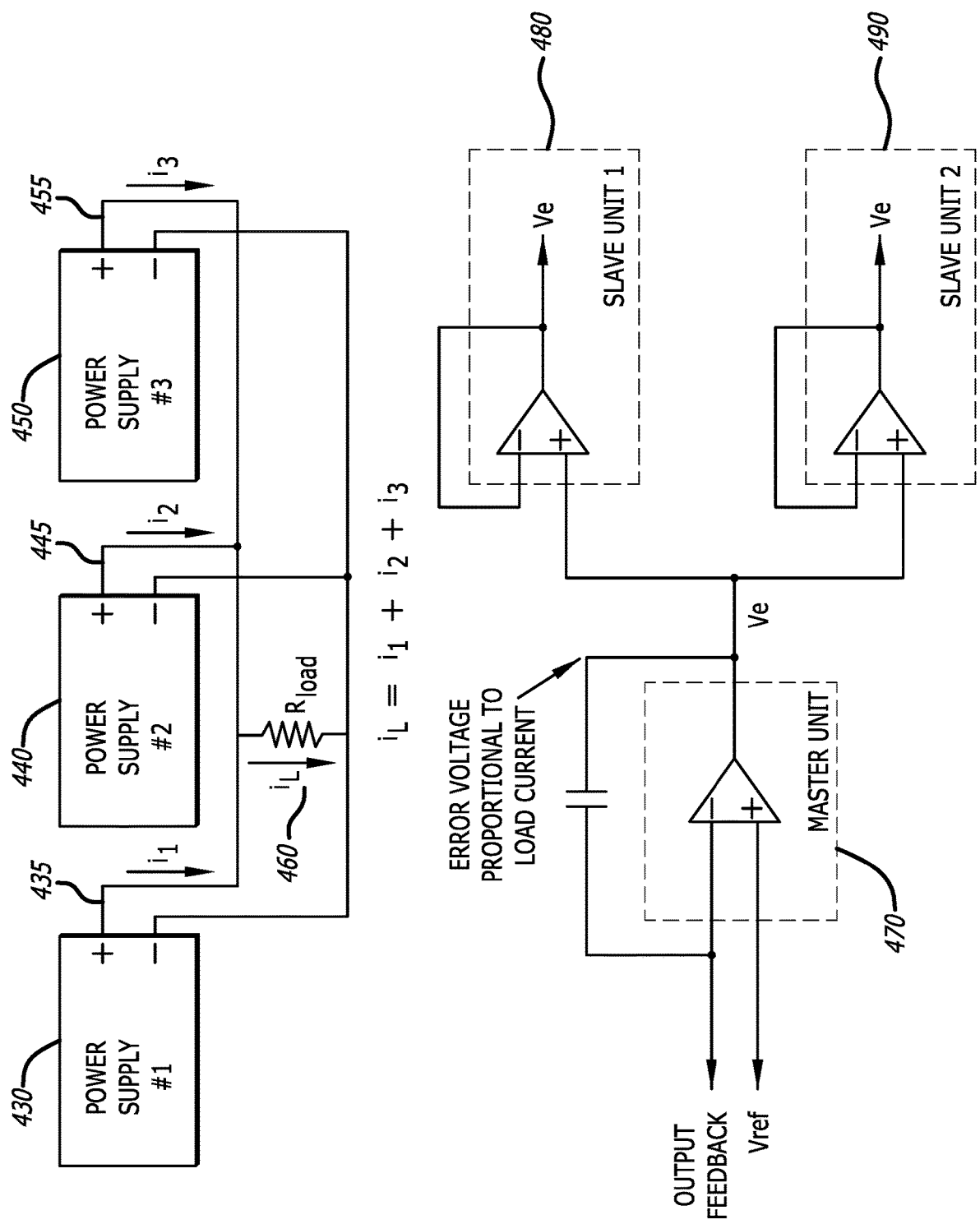
FIG. 4B is a conceptual schematic of a power sharing arrangement, in accordance with various embodiments of the disclosure.

Referring to FIG. 4B, a conceptual schematic of a power sharing arrangement, in accordance with various embodiments of the disclosure is shown. The embodiment depicted in FIG. 4B shows a schematic arrangement for an I-Share system. A first power supply 430, second power supply 440, and a third power supply 450. The first power supply 430 is associated with a first current i1 435, the second power supply 440 is associated with a second current i2 445, and the third power supply 450 is associated with a third current i3 455. A load current iL 460 can be determined by adding up the first current 435, second current 445, and third current 455. This can be utilized in an I-Share scenario. Likewise, a master unit 470 is electrically connected to a first slave unit 480 and a second slave unit 490. As highlight in FIG. 4B, the error voltage can be proportional to the load current.

Although specific embodiments for power sharing arrangements suitable for carrying out the various steps, processes, methods, and operations described herein is discussed with respect to FIGS. 4A-4B, any of a variety of systems and/or processes may be utilized in accordance with embodiments of the disclosure. For example, the specific layout or schematic of a shared load or other I-share setup may vary depending on the specific deployment utilized or the overall application desired. The embodiments shown herein are utilized for illustrative purposes and are not meant to be limiting to those specific configurations. The elements depicted in FIGS. 4A-4B may also be interchangeable with other elements of FIGS. 1-3B and 5-12 as required to realize a particularly desired embodiment.

Figure 5:
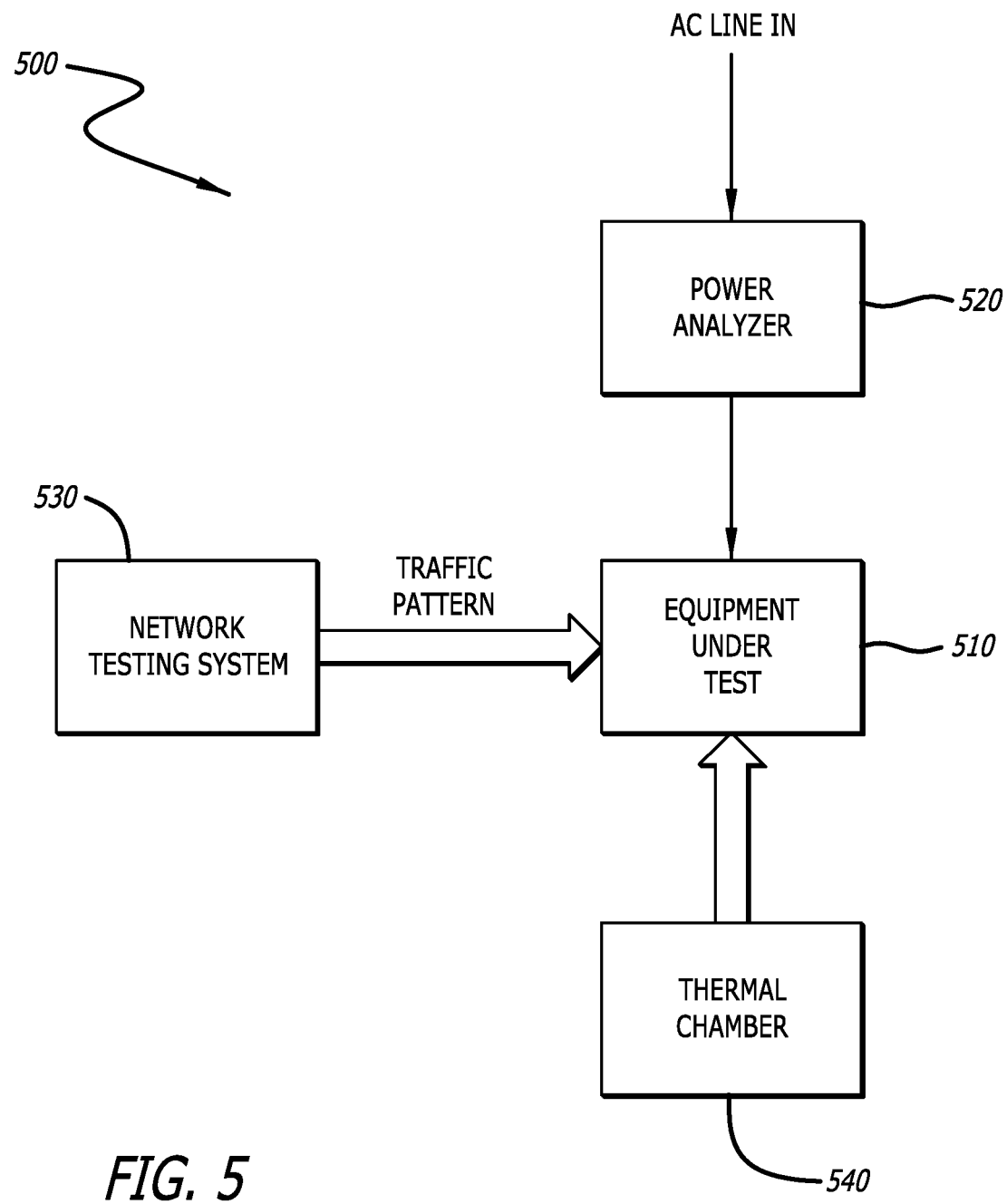
FIG. 5 is a conceptual illustration of a measurement process, in accordance with various embodiments of the disclosure.

Referring to FIG. 5, a conceptual illustration of a measurement process, in accordance with various embodiments of the disclosure is shown. In many embodiments described herein, the accurate measuring of power can be done in a plurality of steps. In the embodiment depicted in FIG. 5, the equipment under test 510 can include any type of network devices, components, power supplies, etc. Indeed, this process can be configured for a variety of different industries and/or environments. As previously discussed, the power is analyzed under various methods. The power analyzer 520 can be utilized as previously discussed and is as known in the art. However, as previous measuring methods have shown to be inadequate by themselves, various embodiments described herein can account and/or standardize or otherwise regulate the temperature and data rate when measuring power.

Certain embodiments can include four parts. In certain embodiments, the first part may include normalizing the load vs the power factor, efficiency, and I-Share curves. This can prevent significant errors in power supply units real power calculations and usage. In various embodiments, each power input line can be monitored for accurate analysis across the various influences. This can be done during the power analysis 520.

In a number of embodiments, the second part can include traffic pattern and packet rate data being utilized. This can be done through one or more network testing systems 530. Those skilled in the art will recognize that various network testing and visibility solutions can be utilized that are known within the market. These tests and data usage can include hardware and/or software tools configured for performance testing, security testing, network visibility, etc.

This data can be configured to stress the system in a manner similar to a typical deployed environment. In more embodiments, the data can be repeatable by a third party. For example, the data can be an Internet Mix, or "IMIX" data which can be configured as a specific combination of packet sizes and types that can simulate a realistic traffic mix on a network, device, component, etc.

In additional embodiments, the third part can include measuring at specific temperatures. The embodiment depicted in FIG. 5 utilizes a thermal chamber 540 which can be configured to control temperature during testing. Testing can be done at a variety of temperatures including, but not limited to, a room temperature test (around 23 degrees Celsius), an acoustic comparative temperature (around 27 degrees Celsius), a high-end normal temperature test (varies depending on the produced identification, model, etc.), and one or more tests that comports with a standardized body, such as the American Society of Heating, Refrigerating and Air-Conditioning Engineers (ASHRAE). For example, ASHRAE can conduct tests at 35, 40, 45, and 50 degrees Celsius.

In certain embodiments, a fourth part can include average the power sums across the various measurements. This can be accurate compared to, and translate easily to other testing methods, allows for defined packet testing, and can be easy to normalize and repeat. In some embodiments, the testing process can be automated and be completed in a matter of hours. This can allow testing for various network device and component types.

Although a specific embodiment for a measurement process suitable for carrying out the various steps, processes, methods, and operations described herein is discussed with respect to FIG. 5, any of a variety of systems and/or processes may be utilized in accordance with embodiments of the disclosure. For example, the specific order utilize may vary. In various embodiments, the testing may be done in one specialized device chamber. In additional embodiments, part of the testing may be utilized by a specialized device. The aspects described in FIG. 5 may also be interchangeable with other elements of FIGS. 1-4B and FIGS. 6-12 as required to realize a particularly desired embodiment.

Referring to FIG. 6, a conceptual illustration of a standardized power usage chart, in accordance with various embodiments of the disclosure is shown. In many embodiments, a chart 600 can be generated for each network product, device, component, etc. The chart 600 can be configured to list a series of unique predetermined temperatures 610 and a series of data rates 620. In various embodiments, the chart 600 may comprise four, six, or eight data sets. However, it is contemplated that the number of temperatures in the series of temperatures 610 and the number of data rates in the series of data rates 620 can vary based on the product, device, component, and/or desired application. The series of temperatures 610 can be configured to mimic typical operating environments for the devices, components, etc.

Each temperature in the series of temperatures 610 may comprise a plurality of packet types 630. These packet types can vary to illustrate differing network conditions. However, these packet types 630, as described above, can be standardized across the tests such that a useful comparison can be achieved. By way of non-limiting example, the series of data rates 620 can cover idle settings, ten-percent utilization, thirty-percent utilization, fifty-percent utilization, seventy-five percent utilization, and one-hundred-percent utilization, such as the embodiment shown in FIG. 6 has.

In a number of embodiments, various data is captured to generate the chart 600. This data can include, but is not limited to, voltage, current, real power, and the power factor for each device, component, etc. that is tested. In further embodiments, data can be captured for various components within a system and subsequently summed. In some embodiments, the chart 600 can be published showing the minimum power utilized, the average of the summed power, the maximum power utilized, a typical sum of the power (which is often the value published in data sheets). These values can be utilized to improve both the accuracy of the calculator and the overall software calculations of the max loading. In more embodiments, configuration factors can be utilized to extend the chart 600 for configurable systems and/or interchangeable product families.

Each plurality of packet types can vary but can be uniform across the series of temperatures 610 such that a more accurate comparison can be made. In the embodiment depicted in FIG. 6, the packet types 630 listed include an IMIX packet type, random data packets with a larger range of size, random data packets with a smaller range of size, and random data with a random size while having an average number of features enabled. However, as those skilled in the art will recognize, the specific data packet types 630 can vary depending on the application desired and the type of device, component, etc. that is being tested.

In additional embodiments, the results can be configured as a value associated with the watts of power utilized per gigabits per second. It is contemplated that other units of measurement may be utilized for different types of devices, etc. A minimum power value can be configured as the lowest power value across all of the sets. In more embodiments, a maximum power value can be configured as the highest power value across all of the series of temperatures 610 and the series of data rates 620. Likewise, in certain embodiments, a summation of the average power can be the sum of all power values across all temperature sets divided by the number of power values.

In still more embodiments, a typical power summation value can be configured as the sum of power values of each of the series of data rates 620 using one or more data packet types within a selected number of temperatures within the series of temperatures 610, divided by the number of power values in each series type. This can be configured to represent the realistic average operating range of a product in more applications. However, for devices, components, etc. that are configured for an internet of things (IoT) or other type device, can further include more extreme temperature values within the series of temperatures 610.

In numerous embodiments, the device being tested may have various components that can be tested themselves. For example, a server device, may have a plurality of cards, ports, or other components that may each be tested and then summed, etc. In these types of embodiments, a 'per measurement' data record can be generated. In addition to the packet types 630 depicted in FIG. 6, a port rate can be recorded, along with a port max rate, etc. For devices that have multiple power supplies, two or more instruments can be utilized to measure them.

As multiple devices within the same product line/family are tested, data can be accumulated to generate additional values. In certain embodiments, the previously tested data records can be utilized to generate a best-case or worst-case usage value. In some embodiments, the best-case value can be generated by dividing the minimum power value by the gigabits per second tested while the worst-case scenario may be generated by dividing the maximum power value by the gigabits per second tested. Additional data related to the state of the components of the devices may also be recorded and shared within the chart depending on the type of device being tested.

Although a specific embodiment for a standardized power usage chart suitable for carrying out the various steps, processes, methods, and operations described herein is discussed with respect to FIG. 6, any of a variety of systems and/or processes may be utilized in accordance with embodiments of the disclosure. For example, the "w/Gbps" listed in the embodiment shown in FIG. 6 may be replaced with actual values derived during the tests. In more embodiments, the format of the chart may vary depending on the device, component, etc. to be tested. The aspects described in FIG. 6 may also be interchangeable with other elements of FIGS. 1-5 and FIGS. 7-12 as required to realize a particularly desired embodiment.

Referring to FIG. 7, a conceptual illustration of utilizing standardized power usage charts to execute network management decisions, in accordance with various embodiments of the disclosure is shown. In many embodiments, this data can be utilized in managing networks, such as to further achieve a goal of reducing carbon emissions. By utilizing accurate and repeatable power measurements, an actual decrease in the overall carbon footprint of a network can be achieved. For example, when given a choice on how to route a packet of data, a sustainability logic may examine the available power usage chart and route the packet along the path that utilizes less power to operate. In further embodiments, the sustainability logic may further cross-reference the available standardized power usage charts 710 with the current operating temperature and overall current telemetry to determine a more accurate estimate of the current power usage of the device being evaluated. In this way, more accurate routing and power usage decisions can be made.

The standardized power usage charts 710 can be utilized to generate various correlations and observations 720 about the actual power being used. Likewise, the standardized power usage charts can be disseminated to customers to create an increased customer engagement 730 with this new evaluation method. In further embodiments, the standardized power usage charts 710 can be provided to and perhaps utilized by various reporting and testing groups 740 (Global Holding Group, Alliance for Telecommunications Industry Solutions, The Community for Telecom Professionals, etc.).

Through this avenues of utilization, numerous benefits can occur. In a number of embodiments, the use of the standardized power usage charts 710 can lead to overall design improvements 750. In more embodiments, an accurate sizing/telemetry advertisement 760 can occur. Finally, as these changes occur across the industry, an overall increase in emissions accuracy 770 can occur, which will conversely bring down the overall rate of emissions released.

Although a specific embodiment for utilizing standardized power usage charts to execute network management decisions suitable for carrying out the various steps, processes, methods, and operations described herein is discussed with respect to FIG. 7, any of a variety of systems and/or processes may be utilized in accordance with embodiments of the disclosure. For example, the specific utilization or deployment of the standardized power usage charts can vary based on the available network, devices, or overall. market conditions. The aspects described in FIG. 7 may also be interchangeable with other elements of FIGS. 1-6 and FIGS. 8-12 as required to realize a particularly desired embodiment.

Figure 8:
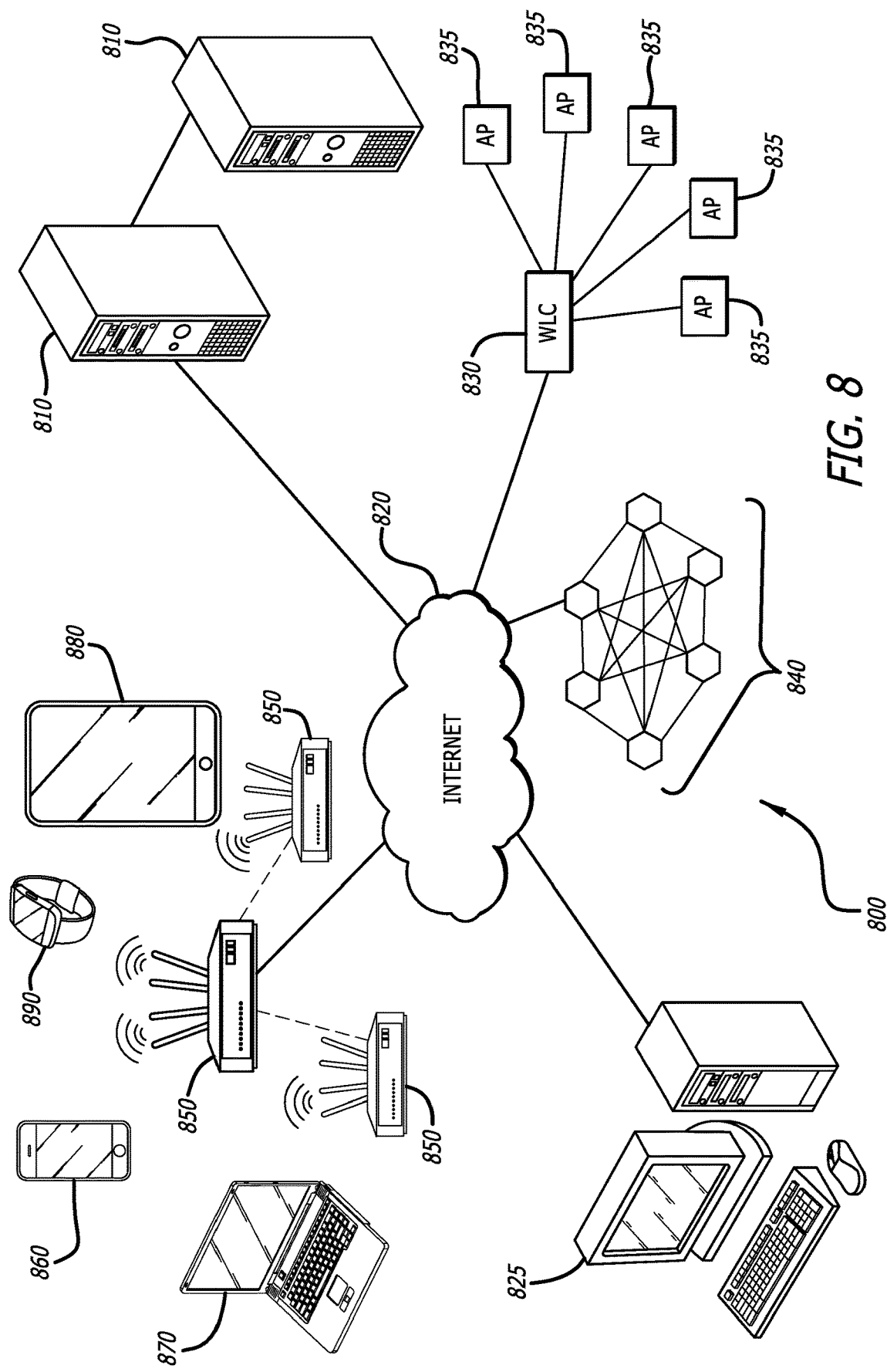
FIG. 8 is a conceptual network diagram of various embodiments that a sustainability logic may operate, in accordance with various embodiments of the disclosure.

Referring to FIG. 8, a conceptual diagram of a network 800 of various environments that a sustainability logic may operate on a plurality of network devices, in accordance with various embodiments of the disclosure is shown. Those skilled in the art will recognize that the sustainability logic can be comprised of various hardware and/or software deployments and can be configured in a variety of ways. In many embodiments, the sustainability logic can be configured as a standalone device, exist as a logic in another network device, be distributed among various network devices operating in tandem, or remotely operated as part of a cloud-based network management tool. In further embodiments, one or more servers 810 can be configured with or otherwise operate the sustainability logic. In many embodiments, the sustainability logic may operate on one or more servers 810 connected to a communication network 820. The communication network 820 can include wired networks or wireless networks. The sustainability logic can be provided as a cloud-based service that can service remote networks, such as, but not limited to a deployed network 840. In many embodiments, the sustainability logic can be a logic that optimizes the energy consumption of the network 800.

However, in additional embodiments, the sustainability logic may be operated as a distributed logic across multiple network devices. In the embodiment depicted in FIG. 8, a plurality of network access points (APs) 850 can operate as the sustainability logic in a distributed manner or may have one specific device operate as the sustainability logic for all of the neighboring or sibling APs 850. The APs 850 facilitate Wi-Fi connections for various electronic devices, such as but not limited to mobile computing devices including laptop computers 870, cellular phones 860, portable tablet computers 880 and wearable computing devices 890.

In further embodiments, the sustainability logic may be integrated within another network device. In the embodiment depicted in FIG. 8, a wireless LAN controller (WLC) 830 may have a sustainability logic that the WLC 830 can use to optimize the energy consumption of the various APs 835 that the WLC 830 is connected to, either wired or wirelessly. In still more embodiments, a personal computer 825 may be utilized to access and/or manage various aspects of the sustainability logic, either remotely or within the network itself. In the embodiment depicted in FIG. 8, the personal computer 825 communicates over the communication network 820 and can access the sustainability logic of the servers 810, or the network APs 850, or the WLC 830.

Although a specific embodiment for various embodiments that a sustainability logic may operate suitable for carrying out the various steps, processes, methods, and operations described herein is discussed with respect to FIG. 8, any of a variety of systems and/or processes may be utilized in accordance with embodiments of the disclosure. For example, the sustainability logic can be configured to execute or otherwise make various network-based decisions in response to one or more standardized power usage charts. This may include, but is not limited to, routing data to devices that are more energy efficient, etc. The aspects described in FIG. 8 may also be interchangeable with other elements of FIGS. 1-7 and FIGS. 9-12 as required to realize a particularly desired embodiment.

Figure 9:
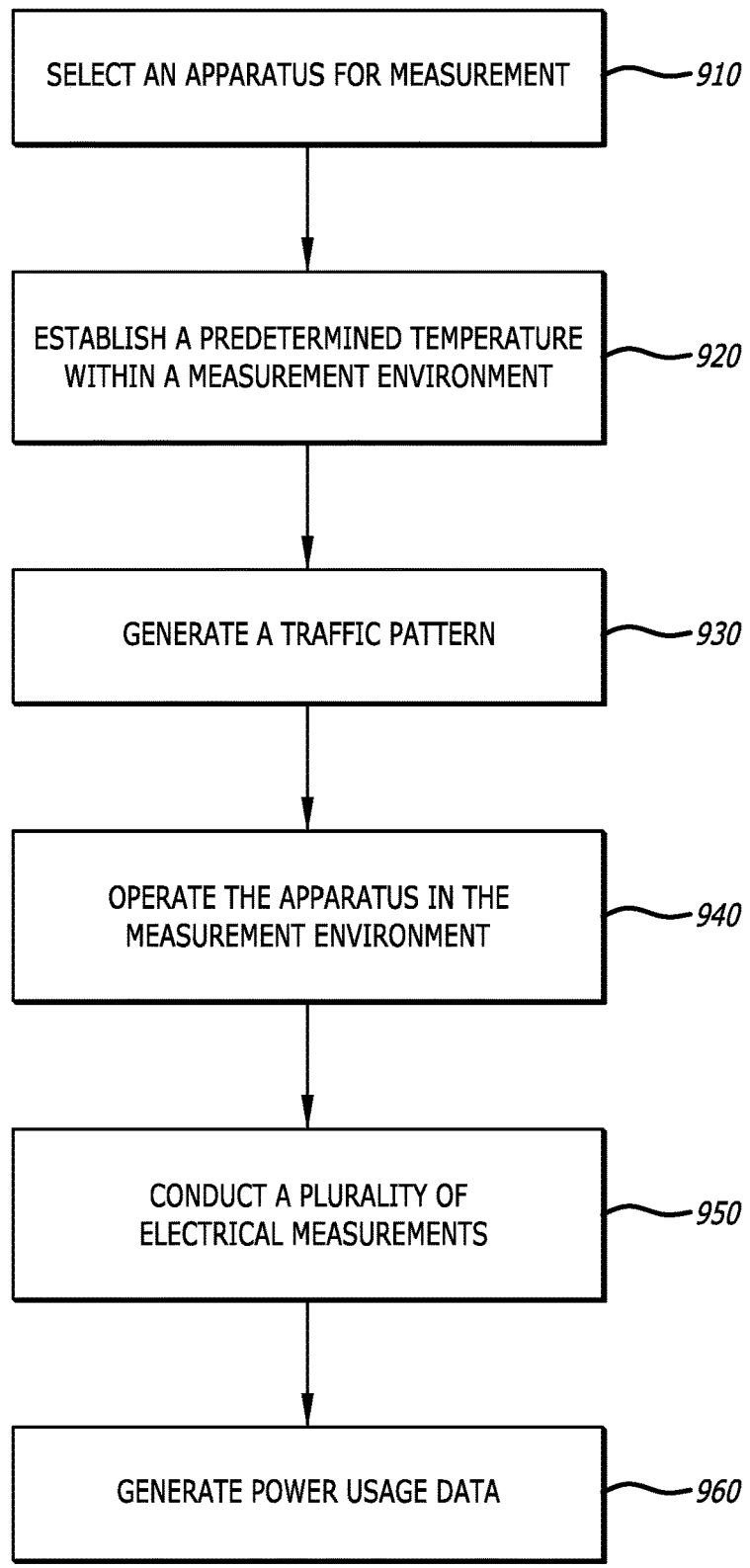
FIG. 9 is a flowchart depicting a process for generating standardized power usage data, in accordance with various embodiments of the disclosure.

Referring to FIG. 9, a flowchart depicting a process 900 for generating standardized power usage data, in accordance with various embodiments of the disclosure is shown. In many embodiments, the process 900 can select an apparatus for measurement (block 910). The apparatus may be a device, such as a network device like a server, switch, access point, router, or the like. In certain embodiments, the apparatus can be a component within a device, such as a power supply.

In a number of embodiments, the process 900 can establish a predetermined temperature within a measurement environment (block 920). A measurement environment can be configured within a testing chamber or other area that can have a regulated and/or known stable temperature. In some embodiments, this may be a specialized testing device that has an enclosed space with a thermostat that can regulate the interior during testing to various temperatures.

In more embodiments, the process 900 can generate a traffic pattern (block 930). As discussed above, traffic patterns can be configured to mimic various daily usage patterns such as the internet, data center, or other location. The traffic patterns may vary and can be somewhat randomly generated such that the randomness is contained to within a certain predetermined range.

In additional embodiments, the process 900 can operate the apparatus in the measurement environment (block 940). In various embodiments, the measurement environment can be a testing chamber that is configured to provide a power supply with various regulated or normalized attributes, and have a data connection to the device such that it may operate within the chamber. In some embodiments, the operation can be done in a room with a stable and known temperature.

In further embodiments, the process 900 can conduct a plurality of electrical measurements (block 950). As discussed above, with respect to FIG. 6, a number of electrical measurements can be made across various temperatures and traffic patterns. Each of the combinations can yield a unique result so taking multiple tests can help to standardize the power usage data between various devices and deployment scenarios.

In still more embodiments, the process 900 can generate power usage data (block 960). The power usage data can be utilized to create one or more standardized power usage charts. The power usage data can include data related to the specific device under testing and may include specific values at a point in time, or can be averaged over a given time window.

Although a specific embodiment for a process for generating standardized power usage data suitable for carrying out the various steps, processes, methods, and operations described herein is discussed with respect to FIG. 9, any of a variety of systems and/or processes may be utilized in accordance with embodiments of the disclosure. For example, measuring environment can be equipped with a normalize or other standardized electrical connection such that a better understanding of the power used can be known. The aspects described in FIG. 9 may also be interchangeable with other elements of FIGS. 1-8 and FIGS. 10-12 as required to realize a particularly desired embodiment.

Figure 10:
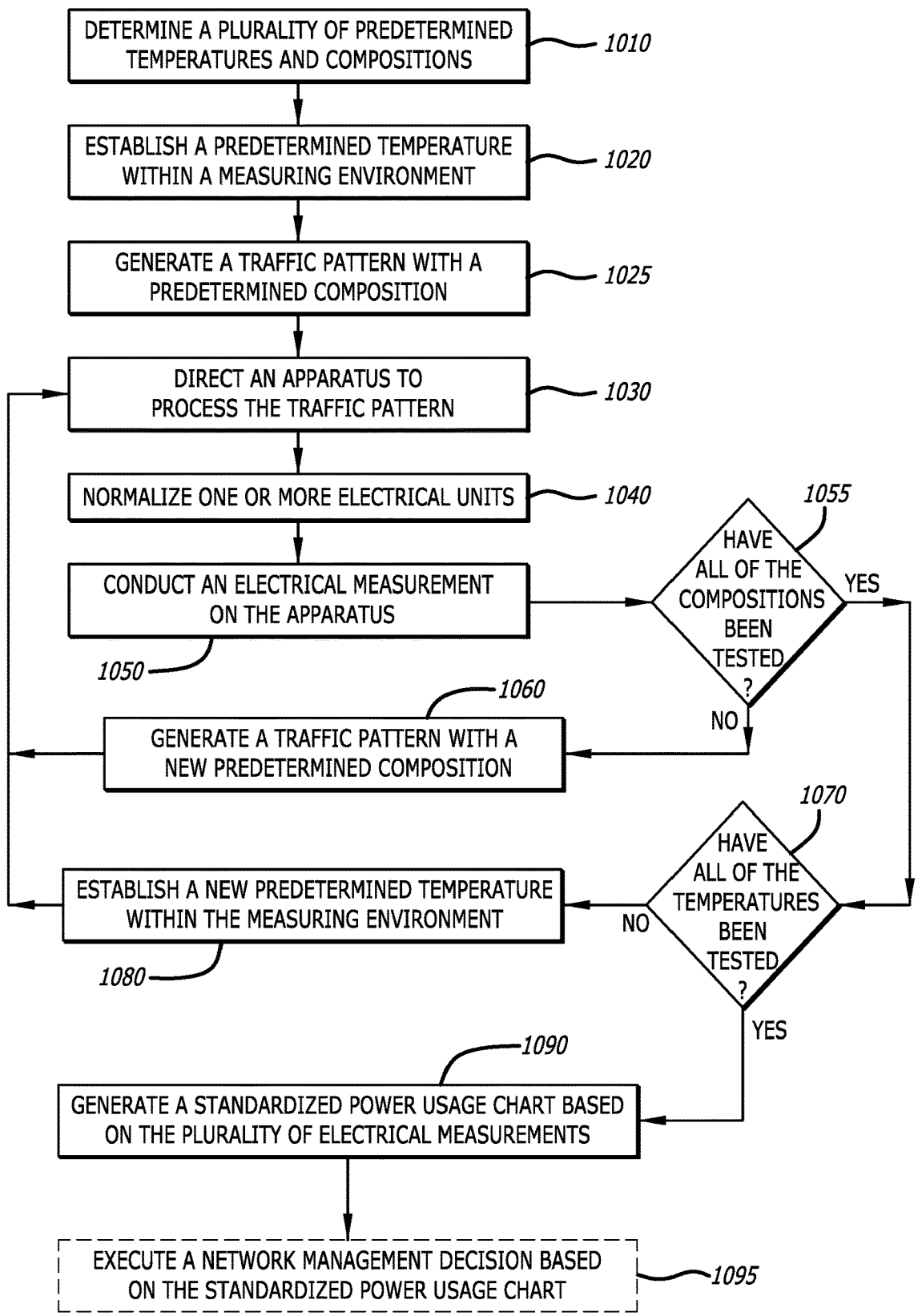
FIG. 10 is a flowchart depicting a process for generating standardized power usage charts, in accordance with various embodiments of the disclosure.

Referring to FIG. 10, a flowchart depicting a process 1000 for generating standardized power usage charts, in accordance with various embodiments of the disclosure is shown. In many embodiments, the process 1000 can determine a plurality of predetermined temperature and compositions (block 1010). To generate a standardized power usage chart, a number of different temperatures and traffic patterns need to be included. The exact mix of these may vary from device to device or component to component.

In a number of embodiments, the process 1000 can establish a predetermined temperature within a measuring environment (block 1020). As described above, a measurement environment can be configured within a testing chamber or other area that can have a regulated and/or known stable temperature. In some embodiments, this may be a specialized testing device that has an enclosed space with a thermostat that can regulate the interior during testing to various temperatures.

In more embodiments, the process 1000 can generate a traffic pattern with a predetermined composition (block 1025). The composition of a traffic pattern can be fixed or at least limited to certain types of data streams. For example, traffic patterns can be configured to mimic various daily usage patterns such as the internet, data center, or other location. The traffic patterns may vary and can be somewhat randomly generated such that the randomness is contained to within a certain predetermined range.

In additional embodiments, the process 1000 can direct an apparatus to process the traffic pattern (block 1030). Typically, this is done through some sort of communicative coupled connection, such as, but not limited to, a network connection. In some embodiments, an ethernet or other wired local area network connection is utilized. However, for certain embodiments, a wireless connection may be desired either in place of or in tandem with a wired connection.

In further embodiments, the process 1000 can normalize one or more electrical units (block 1040). The electrical units can be selected based on the type of power supply being utilized. However, the type of device and/or component being tested may also direct which electrical attributes should be normalized or otherwise standardized across various tests. This can help show the true power used during normal operation.

In still more embodiments, the process 1000 can conduct an electrical measurement on the apparatus (block 1050). The electrical measurement can be configured to occur over a series of instant points in time, or may be done over a time window that is averaged out or otherwise valued at a maximum or minimum value, etc. The length of the tests can vary based on these variables.

Subsequently, the process 1000 can determine if all of the compositions have been tested (block 1055). If it is determined that one or more compositions are still left to be tested, the process 1000 can generate a traffic pattern with a new predetermined composition (block 1060). This new predetermined composition can then be processed by the apparatus (block 1030).

However, if it is determined that all compositions have been tested, the process 1000 can subsequently determine if all of the temperature ranges have been tested (block 1070). If there are one or more temperature ranges that are required to be tested, the process 1000 can establish a new predetermined temperature within the measuring environment (block 1080). This can begin a new set of reconfigurations and testing of various compositions of traffic patterns for that temperature setting.

However, if all of the temperature ranges have been tested, then the process 1000 can generate a standardized power usage chart based on the plurality of electrical measurements (block 1090). The standardized power usage chart can be configured to match previously released standardized power usage charts. In some embodiments, the standardized power usage chart may be stored as data and utilized for various decision-making operations.

Finally, in certain optional embodiments, the process 1000 can execute a network management decision based on the standardized power usage chart (block 1095). In response to the standardized power usage chart data, the process 1000 can determine that one or more data packets should be routed to a different location. In some embodiments, the process 1000 can determine one or more network devices to shut down or put in a lower-power state based on the available standardized power usage charts.

Although a specific embodiment for a process for generating standardized power usage charts suitable for carrying out the various steps, processes, methods, and operations described herein is discussed with respect to FIG. 10, any of a variety of systems and/or processes may be utilized in accordance with embodiments of the disclosure. For example, the order of the processing herein can vary based on the application desired. The aspects described in FIG. 10 may also be interchangeable with other elements of FIGS. 1-9 and FIGS. 11-12 as required to realize a particularly desired embodiment.

Figure 11:
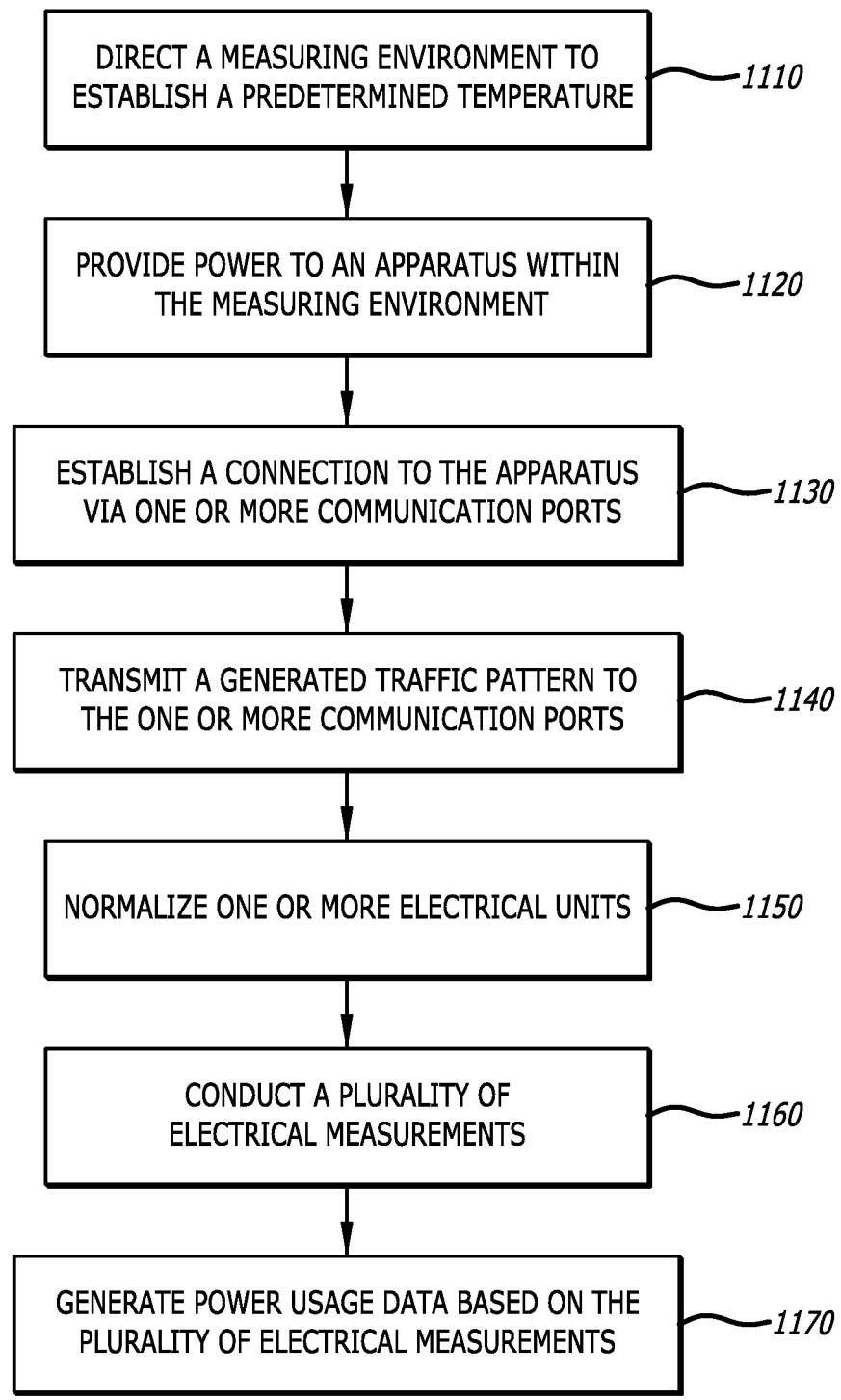
FIG. 11 is a flowchart depicting a process for conducting measurements to generate standardized power usage data, in accordance with various embodiments of the disclosure.

Referring to FIG. 11, a flowchart depicting a process 1100 for conducting measurements to generate standardized power usage data, in accordance with various embodiments of the disclosure is shown. In many embodiments, the process 1100 can direct a measuring environment to establish a predetermined temperature (block 1110). A measuring environment may typically have a known/stable temperature that can be regulated through a thermostat or other control system. The process 1100 may either have direct access over that control system, or can direct or otherwise transmit a signal to a control system to apply a certain testing temperature.

In a number of embodiments, the process 1100 can provide power to an apparatus within the measuring environment (block 1120). In some embodiments, the measuring environment is a testing chamber. Within such a chamber, a power supply may be provided that can be utilized by an apparatus that is to undergo testing.

In more embodiments, the process 1100 can establish a connection to the apparatus via one or more communication ports (block 1130). In certain embodiments, the measuring environment can be configured with one or more wired connections, such as, but not limited to, an ethernet connection, or other wired and/or wireless connection.

In additional embodiments, the process 1100 can transmit a generated traffic pattern to the one or more communication ports (block 1140). As described above, a plurality of various traffic patterns can be generated with different use compositions. The traffic pattern can be sent to the apparatus to be tested through one or more communicatively coupled connections.

In still more embodiments, the process 1100 can normalize one or more electrical units (block 1150). The electrical units can be selected based on the type of power supply being utilized. However, the type of device and/or component being tested may also direct which electrical attributes should be normalized or otherwise standardized across various tests. This can help show the true power used during normal operation.

In various embodiments, the process 1100 can conduct a plurality of electrical measurements (block 1160). The electrical measurements can be configured to occur over a series of instant points in time, or may be done over a time window that is averaged out or otherwise valued at a maximum or minimum value, etc. The length of the tests can vary based on these variables.

In further embodiments, the process 1100 can generate power usage data based on the plurality of electrical measurements (block 1170). The power usage data can be utilized to create one or more standardized power usage charts. The power usage data can include data related to the specific device under testing and may include specific values at a point in time, or can be averaged over a given time window.

Although a specific embodiment for a process for conducting measurements to generate standardized power usage data suitable for carrying out the various steps, processes, methods, and operations described herein is discussed with respect to FIG. 11, any of a variety of systems and/or processes may be utilized in accordance with embodiments of the disclosure. For example, X. The aspects described in FIG. 11 may also be interchangeable with other elements of FIGS. 1-10 and FIG. 11 as required to realize a particularly desired embodiment.

Figure 12:
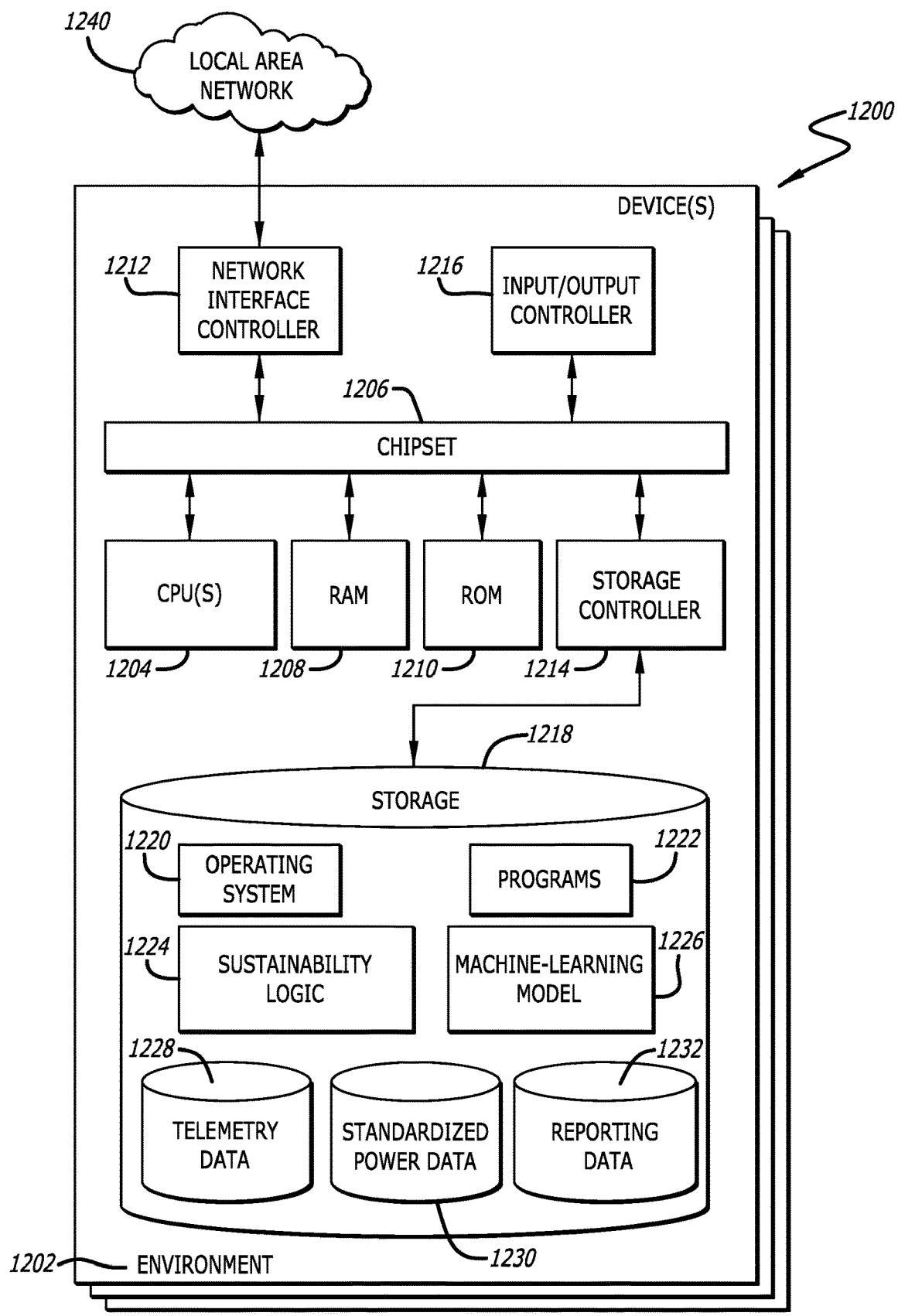
FIG. 12 is a conceptual block diagram of a device suitable for configuration with a sustainability logic, in accordance with various embodiments of the disclosure.

Referring to FIG. 12, a conceptual block diagram of a device 1200 suitable for configuration with a sustainability logic, in accordance with various embodiments of the disclosure is shown. The embodiment of the conceptual block diagram depicted in FIG. 12 can illustrate a conventional server, computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 12 can also illustrate an access point, a switch, or a router in accordance with various embodiments of the disclosure. The device 1200 may, in many non-limiting examples, correspond to physical devices or to virtual resources described herein.

In many embodiments, the device 1200 may include an environment 1202 such as a baseboard or "motherboard," in physical embodiments that can be configured as a printed circuit board with a multitude of components or devices connected by way of a system bus or other electrical communication paths. Conceptually, in virtualized embodiments, the environment 1202 may be a virtual environment that encompasses and executes the remaining components and resources of the device 1200. In more embodiments, one or more processors 1204, such as, but not limited to, central processing units ("CPUs") can be configured to operate in conjunction with a chipset 1206. The processor(s) 1204 can be standard programmable CPUs that perform arithmetic and logical operations necessary for the operation of the device 1200.

In a number of embodiments, the processor(s) 1204 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 1206 may provide an interface between the processor(s) 1204 and the remainder of the components and devices within the environment 1202. The chipset 1206 can provide an interface to a random-access memory ("RAM") 1208, which can be used as the main memory in the device 1200 in some embodiments. The chipset 1206 can further be configured to provide an interface to a computer-readable storage medium such as a read-only memory ("ROM") 1210 or non-volatile RAM ("NVRAM") for storing basic routines that can help with various tasks such as, but not limited to, starting up the device 1200 and/or transferring information between the various components and devices. The ROM 1210 or NVRAM can also store other application components necessary for the operation of the device 1200 in accordance with various embodiments described herein.

Additional embodiments of the device 1200 can be configured to operate in a networked environment using logical connections to remote computing devices and computer systems through a network, such as the network 1240. The chipset 1206 can include functionality for providing network connectivity through a network interface card ("NIC") 1212, which may comprise a gigabit Ethernet adapter or similar component. The NIC 1212 can be capable of connecting the device 1200 to other devices over the network 1240. It is contemplated that multiple NICs 1212 may be present in the device 1200, connecting the device to other types of networks and remote systems.

In further embodiments, the device 1200 can be connected to a storage 1218 that provides non-volatile storage for data accessible by the device 1200. The storage 1218 can, for instance, store an operating system 1220, applications 1222, telemetry data 1228, standardized power data 1230, and reporting data 1232, which are described in greater detail below. The storage 1218 can be connected to the environment 1202 through a storage controller 1214 connected to the chipset 1206. In certain embodiments, the storage 1218 can consist of one or more physical storage units. The storage controller 1214 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The telemetry data 1228 may include one or more descriptions about the configuration or actions of the network. The standardized power data 1230 can include one or more configurations on how various tests are supposed to be conducted. The reporting data 1232 may include information about power usage or other testing results that are to be reported out.

The device 1200 can store data within the storage 1218 by transforming the physical state of the physical storage units to reflect the information being stored. The specific transformation of physical state can depend on various factors. Examples of such factors can include, but are not limited to, the technology used to implement the physical storage units, whether the storage 1218 is characterized as primary or secondary storage, and the like.

In many more embodiments, the device 1200 can store information within the storage 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1200 can further read or access information from the storage 1218 by detecting the physical states or characteristics of one or more particular locations within the physical storage units.

In addition to the storage 1218 described above, the device 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1200. In some examples, the operations performed by a cloud computing network, and or any components included therein, may be supported by one or more devices similar to device 1200. Stated otherwise, some or all of the operations performed by the cloud computing network, and or any components included therein, may be performed by one or more devices 1200 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1218 can store an operating system 1220 utilized to control the operation of the device 1200. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1218 can store other system or application programs and data utilized by the device 1200.

In many additional embodiments, the storage 1218 or other computer-readable storage media is encoded with computer-executable instructions which, when loaded into the device 1200, may transform it from a general-purpose computing system into a special-purpose computer capable of implementing the embodiments described herein. These computer-executable instructions may be stored as application 1222 and transform the device 1200 by specifying how the processor(s) 1204 can transition between states, as described above. In some embodiments, the device 1200 has access to computer-readable storage media storing computer-executable instructions which, when executed by the device 1200, perform the various processes described above with regard to FIGS. 1-11. In certain embodiments, the device 1200 can also include computer-readable storage media having instructions stored thereupon for performing any of the other computer-implemented operations described herein.

In many further embodiments, the device 1200 may include a sustainability logic 1224. The sustainability logic 1224 can be configured to perform one or more of the various steps, processes, operations, and/or other methods that are described above. Often, the sustainability logic 1224 can be a set of instructions stored within a non-volatile memory that, when executed by the controller(s)/processor(s) 1204 can carry out these steps, etc. In some embodiments, the sustainability logic 1224 may be a client application that resides on a network-connected device, such as, but not limited to, a server, switch, personal or mobile computing device in a single or distributed arrangement. In certain embodiments, the sustainability logic 1224 reduces the energy consumption of the network by creating and managing one or more energy management groups in the network.

In still further embodiments, the device 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can be configured to provide output to a display, such as a computer monitor, a flat panel display, a digital projector, a printer, or other type of output device. Those skilled in the art will recognize that the device 1200 might not include all of the components shown in FIG. 12 and can include other components that are not explicitly shown in FIG. 12 or might utilize an architecture completely different than that shown in FIG. 12.

As described above, the device 1200 may support a virtualization layer, such as one or more virtual resources executing on the device 1200. In some examples, the virtualization layer may be supported by a hypervisor that provides one or more virtual machines running on the device 1200 to perform functions described herein. The virtualization layer may generally support a virtual resource that performs at least a portion of the techniques described herein.

Finally, in numerous additional embodiments, data may be processed into a format usable by a machine-learning model 1226 (e.g., feature vectors), and or other pre-processing techniques. The machine-learning ("ML") model 1226 may be any type of ML model, such as supervised models, reinforcement models, and/or unsupervised models. The ML model 1226 may include one or more of linear regression models, logistic regression models, decision trees, Naïve Bayes models, neural networks, k-means cluster models, random forest models, and/or other types of ML models 1226.

The ML model(s) 1226 can be configured to generate inferences to make predictions or draw conclusions from data. An inference can be considered the output of a process of applying a model to new data. This can occur by learning from at least the telemetry data 1228, the standardized power data 1230, and the reporting data 1232, and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 1226 may be generated by human/administrator verifications or may compare predicted outcomes with actual outcomes.

Although a specific embodiment for a device suitable for configuration with a sustainability logic for carrying out the various steps, processes, methods, and operations described herein is discussed with respect to FIG. 12, any of a variety of systems and/or processes may be utilized in accordance with embodiments of the disclosure. For example, the device 1200 may be in a virtual environment such as a cloud-based network administration suite, or it may be distributed across a variety of network devices or switches. The elements depicted in FIG. 12 may also be interchangeable with other elements of FIGS. 1-11 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A method for generating standardized power usage data, comprising:
    selecting an apparatus for measurement within a measuring environment;
    establishing a predetermined temperature within the measuring environment;
    generating a traffic pattern with a predetermined composition;
    operating the apparatus by processing the traffic pattern;
    normalizing one or more electrical units for an electrical measurement process;
    conducting the electrical measurement process on the apparatus; and
    generating power usage data based on the electrical measurement process.

2. The method of claim 1, wherein the electrical measurement process is conducted two or more times.

3. The method of claim 2, wherein the measuring environment is established to a unique predetermined temperature for each of the two or more electrical measurement processes.

4. The method of claim 2, wherein the traffic pattern is generated with a unique composition for each of the two or more electrical measurement processes.

5. The method of claim 3, wherein the traffic pattern is generated with a unique composition for each of the two or more electrical measurement processes.

6. The method of claim 3, wherein at least one of the unique predetermined temperatures is a room temperature.

7. The method of claim 4, wherein the measuring environment is established to a unique predetermined temperature for each of the two or more electrical measurement processes.

8. The method of claim 7, wherein the generation of the power usage data is based on the two or more electrical measurement processes.

9. The method of claim 1, wherein the apparatus is configured to utilize electricity.

10. The method of claim 1, wherein the apparatus is a network device.

11. The method of claim 1, wherein the apparatus is a component configured for use within a network device.

12. The method of claim 1, wherein the electrical units are comprised of at least one of: a power load vs a power factor, power efficiency, or an I-share curve.

13. The method of claim 1, wherein the traffic pattern is configured to mimic typical usage associated with the apparatus.

14. A device comprising:
    a processor;
    a memory communicatively coupled to the processor;
    a plurality of elements; and
    a sustainability logic configured to:
        establish a predetermined temperature within a measuring environment;
        generate a traffic pattern with a predetermined composition;
        operate an apparatus by directing the apparatus to process the traffic pattern;
        normalize one or more electrical units for an electrical measurement process;
        conduct the electrical measurement process on the apparatus; and
        generate power usage data based on the electrical measurement process.

15. The device of claim 14, wherein the conducting of the electrical measurement process on the apparatus while processing the one or more traffic patterns.

16. The device of claim 15, wherein the processing of the one or more traffic patterns is configured to occur via one or more communication ports.

17. The device of claim 14, wherein conducting the electrical measurement process is repeated at a plurality of unique combinations of predetermined temperatures and predetermined compositions.

18. The device of claim 17, wherein the generating of the power usage data is based on the repeated electrical measurement processes.

19. The device of claim 18, wherein the sustainability logic is further configured to execute at least one network management decision based on the generated power usage data.

20. A device comprising:
    a processor;
    a memory communicatively coupled to the processor;
    a plurality of elements; and
    a sustainability logic configured to:
        direct a measuring environment to establish a predetermined temperature;
        provide power to an apparatus within the measuring environment;
        establish a connection to the apparatus via one or more communication ports;
        transmit a generated traffic pattern over the one or more communication ports;
        normalize one or more electrical units for an electrical measurement process;
        conduct the electrical measurement process on the apparatus; and
        generate power usage data based on the electrical measurement process.

* * * * *